Patented Nov. 24, 1953

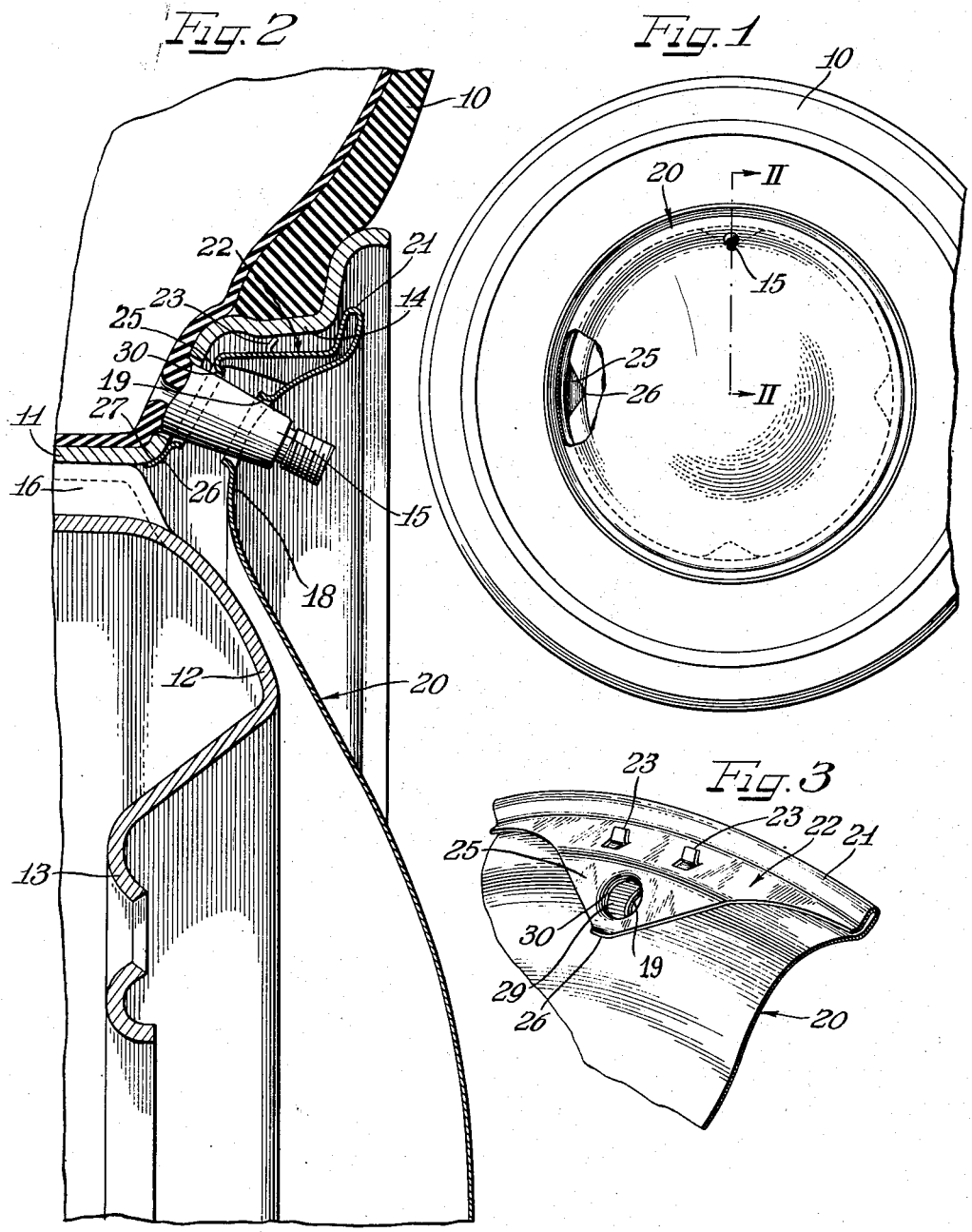

2,660,478

UNITED STATES PATENT OFFICE 2,660,478

WHEEL STRUCTURE

George Albert Lyon, Detroit, Mich.

Application September 2, 1949, Serial No. 113,816

3 Claims. (Cl. 301—37)

This invention relates to automobile wheel covers and more particularly to retaining means for detachably holding the cover on the outer side of a wheel.

An object of this invention is to provide improved retaining means for a wheel cover for detachably holding the cover on the wheel as well as improved centering means for cooperation with a valve stem in the positioning of the cover on the wheel.

Another object of this invention is to provide a wheel cover with improved means to prevent creepage of the cover on the wheel as the wheel rotates.

Yet another object of the invention is the provision of retaining means for a wheel cover which can be economically formed out of corners of the blank from which the cover is stamped.

In accordance with the general features of this invention there is provided a circular wheel cover for cooperation with a multi-flange drop center tire rim. The cover has its outer peripheral portion underturned into a rearwadly extending flange provided with spaced retaining portions formed with radially and axially outwardly extending fingers, each of narrow radial depth and each having an edge for retaining engagement with a rim flange, and at least one of said portions being provided with gripping means for engagement around the base of the valve stem to assist in centering the cover and in preventing creepage of the cover on the wheel.

Another feature of the invention relates to the forming of the spaced retaining portions and fingers of the cover out of corners of a blank from which the circular cover is stamped.

Other objects, features and advantages of the present invention will be readily apparent from the following detailed description of certain preferred embodiments thereof taken in conjunction with the accompanying drawings, in which:

Figure 1 is a fragmentary side view of a wheel showing my novel cover applied thereto and partly broken away to illustrate one of the cover retaining portions;

Figure 2 is an enlarged fragmentary cross-sectional view taken on substantially the line II—II of Figure 1; and Figure 3 is a fragmentary rear view of a portion of the cover showing in perspective the construction of one of the retaining portions of the cover.

As shown on the drawings:

The subject matter of this application is, with respect to the retaining means, in part a continuation of that disclosed in my copending application Serial No. 62,178, filed November 26, 1948, now abandoned.

The reference character 10 designates generally a conventional pneumatic tire and tube assembly mounted in the usual way upon a multiflange drop center type of tire rim 11 which is in turn carried by the usual wheel body or supporting member 12. This supporting member 12 is dished centrally into a bolt-on flange 13 by means of which the wheel may be attached in a conventional manner to the brake drum assembly of an automobile wheel.

The flanged rim 11 includes at least one generally axially extending flange 14 of which use is made in the retaining of my cover on the wheel to be hereinafter described. Also, one of the flanges is apertured in the usual way to accommodate the conventional valve stem 15 of the tire and tube assembly 10.

In addition the wheel body member 12 has a plurality of transverse openings 16 of any suitable conventional construction, adjacent the base of the rim and which are at present employed to let air circulate through the wheel around the brake drum (not shown).

Cooperable with this conventional wheel assembly is a circular sheet metal cover 20 embodying the features of this invention. This cover has an intermediate dished portion 18 provided with a circular opening defined by a flange 19 and through which the outer end of the valve stem 15 is adapted to extend so as to be accessible to the exterior of the cover without requiring removal of the cover from the wheel. The flange 19 is adapted to snugly, but not tightly, fit around the valve stem in a manner well known in the art.

The outer peripheral portion of the cover 20 is turned back upon itself into an annular concealed flange 21 (Figure 3) which in turn is provided with a plurality of rearwardly projecting resilient retaining portions designated generally by the reference character 22. These portions 22 may be of any suitable number, although they can be ideally made 4 in number since in that event they can be formed from 4 corners of a blank from which the circular cover is stamped.

Now it will be perceived that the flange 21 by reason of its continuity is relatively rigid in comparison to the portions 22 because such portions are discontinuous or rather have recesses between them. As a consequence, each of the portions 22 is relatively resilient and hence yields generally in a radial direction in the application and removal of the cover.

Each of these portions 22 has one or more radially and axially inwardly inclined retaining fingers 23 presenting a blunt edge for tightly gripping the surface of the rim flange 14. From Figure 3 it will be perceived that I have provided each retaining portion 22 with two such fingers 23 which are punched out of the portion 22. These fingers 23 are of relatively shallow radial depth and are in themselves relatively rigid and stiff as compared to the portion 22 in general. As a consequence, as these fingers cammingly engage the rim surface 14 they do not in themselves flex but present a rigid front to the flange and yield only through the resiliency of the carrying or main portion 22.

Normally, when the cover is off the wheel, the edges or all of the fingers 23 are arranged generally in a circle of a diameter slightly greater than the greatest diameter of the inner surface of the flange 14 so as to require flexing radially inwardly as the cover is pressed axially home onto the wheel. This enables the fingers to firmly engage the rim flange and yet be detachable therefrom upon the application of a pry-off force to the outer flange 21 as by means of a screw driver or the like.

In addition, each portion 22 has inclined radially inwardly an extension 25 terminating in a lip 26 adapted to snugly grip the base flange at 27 (Figure 2) when the cover is fully home on the wheel. These turned lips 26 serve as a means for limiting the axial inward movement of the cover whereby the outer flange edge 21 will be slightly spaced and out of contact with the rim when the cover 20 is in position on the wheel. In other words, the cover is adapted to yieldably bottom on the wheel at 27 through the means of turned lips 26 on the portions 22.

Now in order to assist in preventing relative circular movement of the cover and wheel or, that is to say, prevent creepage, I provide one of the extensions 25 with an aperture 29 defined by a flange 30 adapted to tightly fit around the valve stem 15. I find that where the valve stem 15 is made of rubber, as is now common practice, it is better to grip the valve stem at its base adjacent the rim. In this respect it will be appreciated that the flange 19, by reason of it engaging an outer portion of the stem, can move slightly due to the flexing of the stem. This is not true of the flange 30 which engages the stem at its base where it is relatively inflexible. In this manner the cover can be firmly held on the valve stem against rotary creepage on the wheel.

It will also be noted that by having the outer flange periphery 21 of the cover spaced from the wheel, air is free to circulate from the wheel openings 16 through the space between the flange 21 and the rim, thereby assisting in keeping the interior parts of the wheel, such as the brake drum, cool.

I claim as my invention:

1. In a cover for a wheel including a multi-flange drop center tire rim having a valve stem projecting therefrom and a supporting body member therefor, a circular cover having an integral underturned inwardly extending flange at the radially outer extremity thereof, said underturned flange terminating in spaced yieldable integral retaining portions extending axially inwardly from said underturned flange and formed with integral radially and axially outwardly inclined fingers, each of narrow depth and each presenting a rigid edge for retaining engagement with a rim flange, said cover having a valve stem aperture spaced radially inwardly from one of said portions and said one portion having an opening aligned with said aperture and defined by an edge for snugly engaging the base of a valve stem to assist in preventing creepage of the cover on the wheel.

2. In a cover for a wheel including a multi-flange drop center tire rim having a valve stem projecting therefrom and a supporting body member therefor, a circular cover having an underturned inwardly extending flange terminating in spaced yieldable retaining portions formed with radially and axially outwardly inclined fingers, each of narrow depth and each presenting a rigid edge for retaining engagement with a rim flange, said cover having a valve stem aperture spaced radially inwardly from one of said portions and said one portion having an opening aligned with said aperture and defined by an edge for snugly engaging the base of a valve stem to assist in preventing creepage of the cover on the wheel, each of said portions also having a radially inward extension for yieldably bottoming against the base of the rim adjacent the supporting member to limit inward axial movement of the cover on the wheel.

3. As an article of manufacture, a circular wheel trim having an outer portion provided with an aperture to receive the extremity of a valve stem and having an integral underturned portion at the radially outer extremity of said outer portion with an opening aligned with but spaced from said aperture and defined by an edge for snugly fitting around the base of a valve stem for the purpose of assisting in preventing rotary creepage of the trim on a wheel, said underturned portion having spaced retaining fingers extending axially inwardly from said underturned portion for detachably holding the trim on a wheel.

GEORGE ALBERT LYON.

References Cited in the file of this patent

UNITED STATES PATENTS

| Number | Name | Date |
|--------|------|------|
| 2,076,789 | Le Jeune | Apr. 13, 1937 |
| 2,143,950 | Kliesrath | Jan. 17, 1939 |
| 2,368,228 | Lyon | Jan. 30, 1945 |
| 2,383,071 | Mulhern | Aug. 21, 1945 |